United States Patent
Yambe

(10) Patent No.: US 6,959,205 B2
(45) Date of Patent: Oct. 25, 2005

(54) DATA COMMUNICATION SYSTEM, CONNECTOR CABLE AND COMMUNICATION ADAPTER MEDIUM USED IN THE DATA COMMUNICATION SYSTEM

(75) Inventor: Haruki Yambe, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 489 days.

(21) Appl. No.: 10/045,095

(22) Filed: Jan. 15, 2002

(65) Prior Publication Data
US 2003/0054858 A1    Mar. 20, 2003

(30) Foreign Application Priority Data
Sep. 18, 2001    (JP) .............................. 2001-282778

(51) Int. Cl.$^7$ .............................................. H04M 1/00
(52) U.S. Cl. ...................... 455/557; 455/558; 455/559
(58) Field of Search .............................. 455/557, 558, 455/559; 379/455, 446, 438

(56) References Cited

U.S. PATENT DOCUMENTS 6,295,460 B1 *   9/2001   Nagel et al. ................ 455/557
6,625,471 B2 *   9/2003   Mori et al. .................. 455/557

FOREIGN PATENT DOCUMENTS

JP            406097991 A  *  4/1994  ................ 455/462

* cited by examiner

Primary Examiner—Erika A. Gary
Assistant Examiner—Wayne Cai
(74) Attorney, Agent, or Firm—Rabin & Berdo, P.C.

(57) ABSTRACT

A data communication system comprises a portable device for effecting radio communication, a communication adapter card for storing therein a plurality of communication protocols corresponding to a plurality of communication systems employed by the portable device, a computer in which the communication adapter card is inserted to execute data processing, and a connector cable composed of a first connector connected to the portable device, a second connector connected to the communication adapter card for outputting identification information to identify one of the communication systems employed by the portable device, and a cable for connecting between the first and second connectors.

4 Claims, 4 Drawing Sheets

FIG. 5

| Communication System | PDC | PHS Guarantee | PHS Best Effort |
|---|---|---|---|
| Communication Protocol | WORM-ARQ | PIAFS 2.0 | PIAFS 2.1 |
| Hardware Interface Specification | Frame Signal Synchronization Half-Duplex Transmission External Clock | Frame Signal Synchronization Full-Duplex Transmission External Clock | Frame Signal Synchronization (switching to 4bit/8bit) Full-Duplex Transmission External Clock |
| Dedicated Connector | 16 Pins | 18 Pins | 12 Pins |

COMMUNICATION SYSTEMS EMPLOYED BY A CELLULAR PHONE

DATA COMMUNICATION SYSTEM, CONNECTOR CABLE AND COMMUNICATION ADAPTER MEDIUM USED IN THE DATA COMMUNICATION SYSTEM

BACKGROUND OF THE INVENTION

1. Field of the Invention

The invention relates to a data communication system, particularly to data communication system for effecting data communication between a portable device and a computer, and a connector cable and communication adapter medium used in the data communication system.

This application is a counterpart of Japanese patent application Serial Number 28778/2001, filed Sep. 18, 2001, the subject matter of which is incorporated herein by reference.

2. Description of the Related Art

A mobile radiophone has become recently widely used remarkably in Japan, and telecommunications companies employ their own communication systems while a standardized communication system has not been employed. For a digital cellular phone, there are communication systems such as a PDC (Personal Digital Cellular) system, cdmaOne system and the like. For a PHS (Personal Handyphone System), there are communication systems such as a guarantee system, a best effort system and the like. The PDC system used here is a TDMA (Time Division Multiple Access) system which is standardized in Japan. Meanwhile, the cdmaOne system is a radio communication system complying with an international standard and is characterized in a high data transmission speed compared with the PDC system. The guarantee system in the PHS complies with a PIAFS (PHS Internet Access Forum Standard) v2.0 to use a fixed transmission speed while the best effort system in the PHS complies with PIAFS v2.1 to use a valuable transmission speed.

FIG. 5 is a table showing an outline of communication protocols, a hardware specification, and an dedicated connector in the PDC system, the guarantee and best effort systems in the PHS as examples of the communication systems. The dedicated connector is varied in the number of the pin in response to the difference in hardware specification, differentiated in shape, and common or not common in signal line, which are inherent in the respective communication systems.

Accordingly, when a user effects data communication with respect to an external device such as the Internet using a computer such as a mobile computer while using these cellular phones as radio terminals, the user has to purchase an independent or separate data communication adapter to be suited for the cellular phone so as to be connected thereto, so that an inconvenience is given to the user. Meanwhile, manufacturers manufacturing these data communication adapters have to supply data communication adapters to a client which adapters are differentiated corresponding to cellular phones of respective telephone companies.

SUMMARY OF THE INVENTION

One of typical data communication systems of the invention comprises a portable device for effecting a radio communication, a communication adapter card for storing therein a plurality of communication protocols corresponding to respective multiple communication systems employed by the portable device, a computer in which the communication adapter card is inserted to execute data processing, a first connector connected to the portable device, a second connector connected the first connector and the communication adapter card to identify one of the communication systems employed by the portable device and a connector cable formed of a cable for connecting the first and second connectors.

Accordingly, it is an object of the invention to provide a data communication system capable of effecting data communication between portable devices having different communication systems and a computer.

BRIEF DESCRIPTION OF THE DRAWINGS

FIG. 5 is a table showing communication systems of a mobile radiophone.

DETAILED DESCRIPTION OF THE PREFERRED EMBODIMENTS

Figure 1:
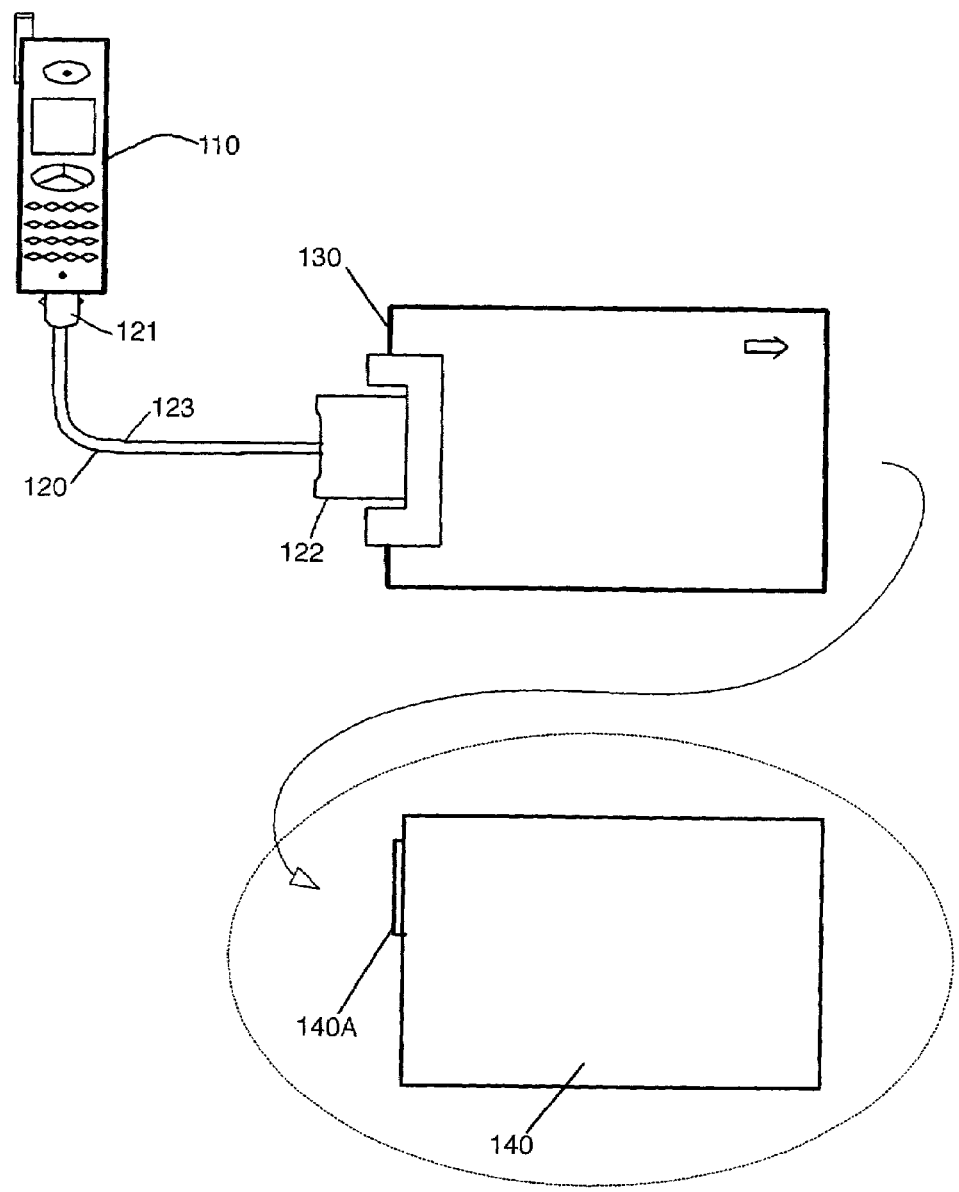
FIG. 1 shows an entire data communication system according to the invention.

FIG. 1 shows an entire data communication system according to the invention. The data communication system of the invention comprises a portable device 110, a connector cable 120, a communication adapter card 130 and a computer 140. The portable device 110 is one of a variety of portable devices employing various communication systems, and effects radio communication. For the portable device 110, there are, e.g. a cellular phone, a PHS telephone or a communication terminal capable of effecting mobile communication. The connector cable 120 comprises a connector (first connector) 121, a connector (second connector) 122 and a cable 123 comprised of a plurality of conducting wires. The cable 123 connects between the connectors 121 and 122. The communication adapter card 130 is a card for effecting data communication corresponding to a communication system of the portable device 110. The hardware specification and software specification of the communication adapter card 130 are complying with the standard of a PCMCIA (Personal Computer Memory Card International Association). The computer 140 has a slot 140A.

The portable device 110 is connected to the computer 140 by way of the connector cable 120 and the communication adapter card 130 and effects data communication between itself and the computer 140. The portable device 110 is connected to the connector 121 of the connector cable 120. The connector 122 of the connector cable 120 is connected to the communication adapter card 130. The communication adapter card 130 is inserted into the slot 140A of the computer 140.

Figure 2:
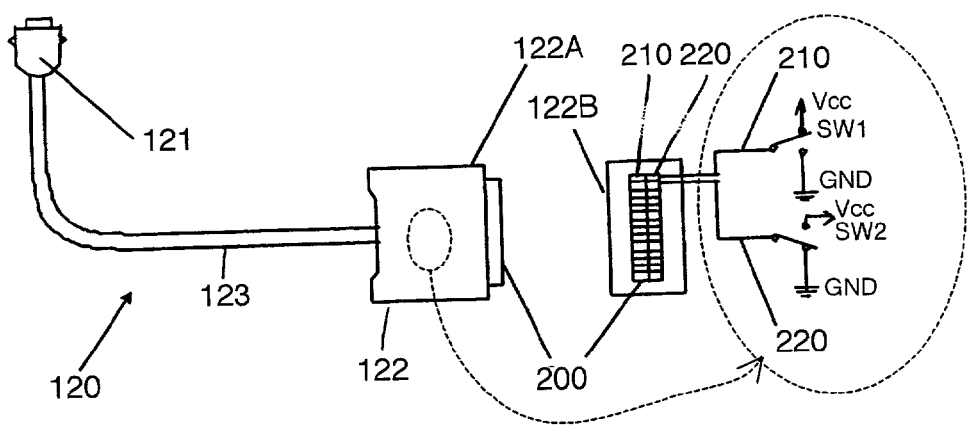
FIG. 2 is a view showing the construction of a connector cable according to a first embodiment of the invention used in the data communication system.

The connector cable 120 used in the data communication system according to the first embodiment of the invention is first described. FIG. 2 is a view showing the construction of the connector cable according to the first embodiment of the invention. The connector cable 120 comprises the connector (first connector) 121, the connector (second connector) 122, and the cable 123 as set forth above. The connector 122 identifies a communication system employed by the portable device 110 and has an identification part for outputting identification information. The identification part comprises a switch SW1 and a switch SW2. The connector 122 has a side surface 122A and a front surface 122B. A connection terminal 200 to be connected to the communication adapter card 130 is provided on the front surface 122B of the connector 122. The connection terminal 200 comprises a plurality of terminals arranged in two rows. Two identification terminals 210, 220 provided on the uppermost position of the connection terminal 200 output identification information representing a communication system employed by the portable device 110. The two identification terminals may be provided at the lowermost position of the connection terminal 200. The identification terminal 210 is connected to the identification part. More in detail, the identification terminal 210 is connected to the switch SW1 provided inside the connector 122 while the identification terminal 220 is connected to the switch SW2 provided to the inside the connector 122. Other ends of the switches SW1, SW2 are connected to either a power supply (VCC) terminal or ground (GND) terminal. That is, there are four combinations for outputting outputs (2-bit outputs) of two identification terminals. As a result, if a 2 /bit identifier is given to each communication system, it is possible to identify up to four communication systems. Although four combinations can be prepared by 2-bit outputs, it is needless to say that sixteen combinations may be prepared by 4-bit outputs.

Figure 3:
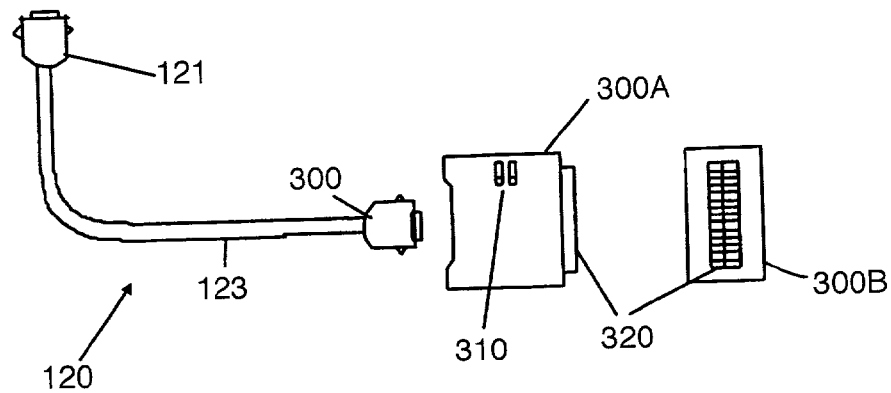
FIG. 3 is a view showing the construction of a connector cable according to a second embodiment of the invention used in the data communication system.

The connector cable used in the data communication system according to a second embodiment of the invention is described next. FIG. 3 is a view showing the construction of the connector cable according to the second embodiment of the invention. A connector cable 120 of the second embodiment comprises a connector 121, a connector 300, and a cable 123. The connector 300 of the connector cable 120 has a side surface 300A and a front surface 300B. A switching part which can be manually switched is provided on the side surface 300A of the connector 300 in response to a communication system employed by a portable device 110. The switching part comprises two dip switches 310. A connection terminal 320 to be connected to a communication adapter card 130 is provided on the front surface 300B of the connector 300. The connection terminal 320 comprises a plurality of terminals arranged in two rows. The connection terminal 200 has two identification terminals. The two identification terminals output identification information representing a communication system employed by the portable device 110.

The two dip switches 310 and two identification terminals are electrically connected to each other. Two identification terminals can output four combinations of 2-bit outputs when the two dip switches 310 are manually switched. As a result, if a 2 /bit identifier is given to each communication system, it is possible to identify up to four communication systems. Accordingly, when a user of the portable device 110 manually switches two dip switches 310 in response to a communication system of the portable device 110, the user can select an optimum communication system from an external device.

Figure 4:
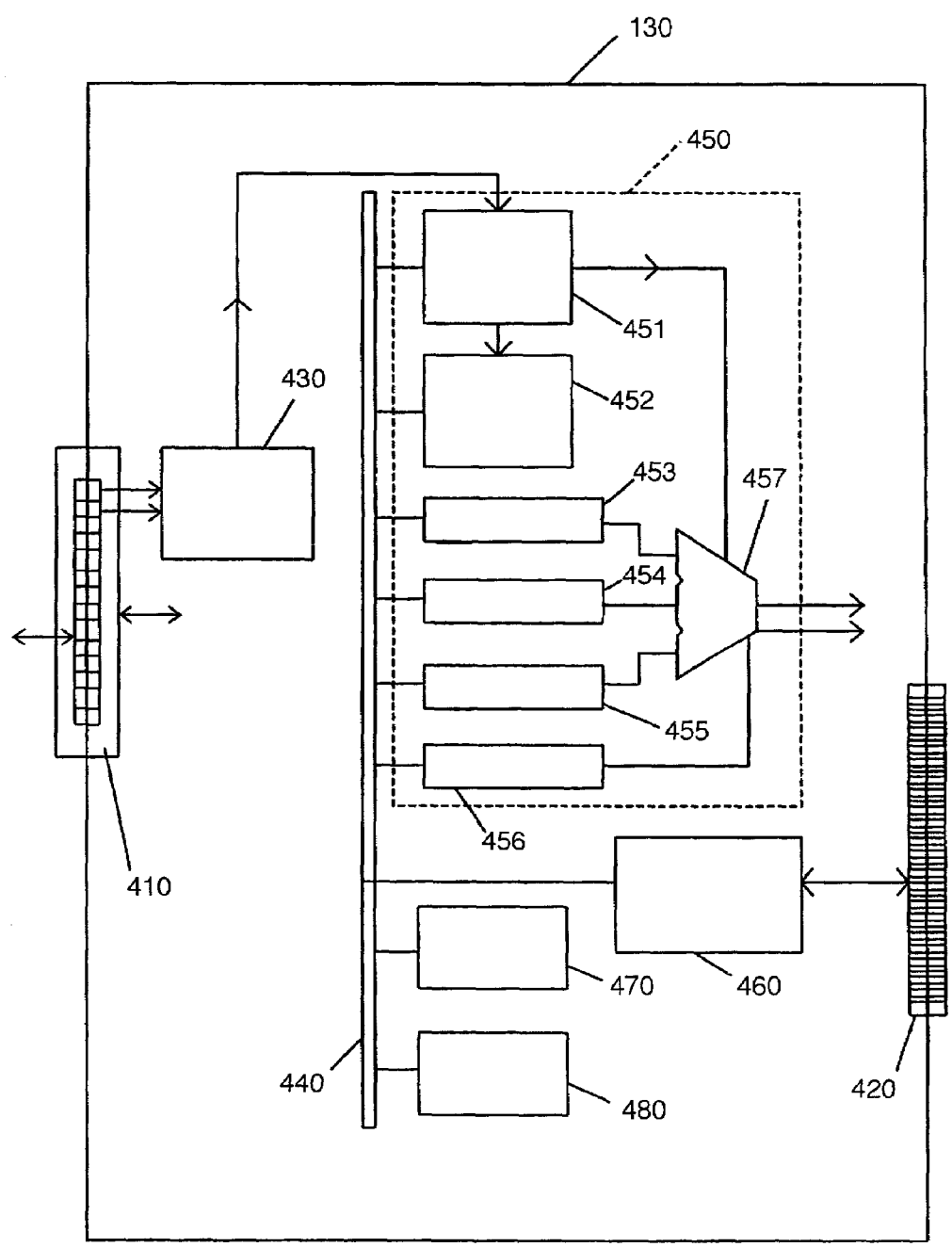
FIG. 4 is a block diagram showing the construction of a communication adapter card used in the data communication system according to a third embodiment of the invention.

A communication adapter card used in the data communication system according to a third embodiment of the invention is described next. FIG. 4 is a block diagram showing the construction of the communication adapter card according to the third embodiment of the invention.

A communication adapter card 130 comprises a connection terminal 410, a PCMCIA terminal 420, a system decision circuit 430, an internal bus 440, a communication system switching circuit 450, a card bus interface 460, a CPU 470, and a memory 480. The connection terminal 410 is connected to connection terminals 200, 320 of a connector cable 120. The system decision circuit 430 is connected to the connection terminal 410 and the communication system switching circuit 450. The communication system switching circuit 450, the card bus interface 460, the CPU 470 and the memory 480 are respectively connected to the internal bus 440. The card bus interface 460 is connected to the PCMCIA terminal 420. The PCMCIA terminal 420 is electrically connected to a computer 140 when the communication adapter card 130 is inserted into a slot 140A of the computer 140.

The system decision circuit 430 is electrically connected to identification terminals of the connection terminals 200, 320 of the connector cable 120. The system decision circuit 430 fetches therein identification signals of the communication systems outputted from the identification terminals of the connection terminals 200, 320 as electric signals. The system decision circuit 430 discriminates a communication system employed by the portable device 110 on the basis of the identification signals, and outputs the result of discrimination.

The communication system switching circuit 450 comprises a protocol selection circuit 451, a status register 452, individual circuits 453, 454, 455, a common circuit 456, and a multiplexer 457. The protocol selection circuit 451, the status register 452, the individual circuits 453, 454, 455, and the common circuit 456 are respectively connected to one another by way of the internal bus 440. The protocol selection circuit 451, the individual circuits 453, 454, 455, and the common circuit 456 are respectively connected to the multiplexer 457. The protocol selection circuit 451 fetches therein the result of discrimination outputted from the system decision circuit 430 and selects one of detailed communication protocols as shown the table of FIG. 5. The protocol selection circuit 451 sets the selected communication protocol at the status register 452. Each of the individual circuits 453, 454, 455 has a protocol engine for executing each communication procedure corresponding to a plurality of communication protocols. The common circuit 456 executes processing which is common to each communication procedure. The multiplexer 457 properly switches the individual circuit 453, the individual circuit 454, the individual circuit 455 and the common circuit 456, and outputs a communication data in multiplex manner or separately based on a control signal outputted from the protocol selection circuit 451. Both the system decision circuit 430 and the communication system switching circuit 450 are realized by an dedicated LSI, thereby achieving low power consumption and miniaturization.

The card bus interface 460 effects communication of data and control signals with respect to the computer 140 by way of the PCMCIA terminal 420 based on an interface complying with the PCMCIA standard. The CPU 470 is a processor for controlling the entire processing of the communication adapter card 130, and it executes the processing in corporation with the memory 480. The communication is executed by the memory 480 under the control of the CPU 470 even if the communication is executed based on any communication protocol. The CPU 470 decides a communication protocol which is selected from information written in the status register 452 and controls to send and receive the communication data in accordance with the communication protocol. The card bus interface 460, the CPU 470 and the memory 480 use a general purpose LSI.

The first to third embodiments of the invention are structured to select one of three communication systems, namely, the PDC system in the cellular phone, the guarantee and best effort systems in the PHS. However, it is needless to say that a communication system other than these three communication systems can be employed. Further, although the communication adapter is formed of the PC card according to the embodiments, it may be formed of an adapter in the form of a USB (universal serial bus) system. Still further, although the switches are provided on the connector cable for identifying the communication systems, they may be provided on the communication adapter card.

What is claimed is:

1. A data communication system comprising:
   a portable device for effecting radio communication;
   a communication adapter card for storing therein a plurality of communication protocols corresponding to a plurality of communication systems employed by the portable device, wherein the communication adapter card selects one of the communication protocols on the basis of identification information;
   a computer in which the communication adapter card is inserted to execute data processing; and
   a connector cable composed of a first connector connected to the portable device, a second connector connected to the communication adapter card for outputting the identification information to identify one of the communication systems employed by the portable device, and a cable for connecting between the first and second connectors;
   wherein the second connector includes a DIP switch for outputting the identification information by manually switching the DIP switch on the basis of the communication system employed by the portable device.

2. The communication adapter medium according to claim 1, wherein the connector outputs the identification information, the identification information comprising identities selected from the group consisting of a personal digital cellular PDC system, a personal handyphone system PHS Guarantee, and a personal handyphone system PHS Best Effort.

3. The communication adapter medium according to claim 1, wherein the second connector comprises two of the DIP switch, including a first DIP switch and a second DIP switch, and outputs the identification information by manually switching the first DIP switch and the second DIP switch.

4. The communication adapter medium according to claim 3, wherein the first DIP switch and the second DIP switch are located on a side surface of the second connector.

* * * * *